(12) United States Patent
Hagström et al.

(10) Patent No.: US 10,033,194 B2
(45) Date of Patent: Jul. 24, 2018

(54) INTELLIGENT ELECTRICAL POWER NETWORK DEVICE

(71) Applicant: ABB Technology AG, Zürich (CH)

(72) Inventors: Kim Hagström, Vaasa (FI); Jarkko Holmlund, Kvevlax (FI); Antti Hakala-Ranta, Vaasa (FI)

(73) Assignee: ABB Schweiz AG, Baden (CH)

( * ) Notice: Subject to any disclaimer, the term of this patent is extended or adjusted under 35 U.S.C. 154(b) by 108 days.

(21) Appl. No.: 14/765,213

(22) PCT Filed: Jan. 24, 2014

(86) PCT No.: PCT/EP2014/051415
§ 371 (c)(1),
(2) Date: Jul. 31, 2015

(87) PCT Pub. No.: WO2014/122034
PCT Pub. Date: Aug. 14, 2014

(65) Prior Publication Data
US 2016/0006255 A1    Jan. 7, 2016

(30) Foreign Application Priority Data
Feb. 6, 2013    (EP) ..................... 13154135

(51) Int. Cl.
*H02J 4/00*        (2006.01)
*H02J 9/00*        (2006.01)
*H02J 9/06*        (2006.01)
(52) U.S. Cl.
CPC ............... *H02J 4/00* (2013.01); *H02J 9/005* (2013.01); *H02J 9/061* (2013.01); *Y02P 80/11* (2015.11)

(58) Field of Classification Search
CPC ... H02J 4/00; H02J 9/005; H02J 9/061; Y02P 80/11
(Continued)

(56) References Cited

U.S. PATENT DOCUMENTS 6,356,057 B1    3/2002   Shilo et al.
2011/0197085 A1*  8/2011  Wu .................... H04B 3/546
                                                   713/323
(Continued)

OTHER PUBLICATIONS

Notification of the First Office Action, State Intellectual Property Office of People's Republic of China, Application Serial No. 201480007422.X, dated Oct. 31, 2016, (9 pages).
(Continued)

*Primary Examiner* — Robert Deberadinis
(74) *Attorney, Agent, or Firm* — Taft Stettinius & Hollister LLP; J. Bruce Schelkopf

(57) ABSTRACT

An intelligent electrical power network control and/or protection device comprises at least one power supply connection for connecting the device to a main power source and an auxiliary power source and at least one unit configured to monitor main power, the unit being configured to activate a signal indicating lack of main power in response to lack of main power. The device further comprises at least one unit configured to provide a state control operation for changing an operating state of at least one unit of the device or an operating state of at least one unit to be connected to the device from an operative mode t a power saving mode in response to the activated signal indicating the detected lack of main power.

19 Claims, 3 Drawing Sheets

(58) Field of Classification Search
USPC .......................................................... 307/126
See application file for complete search history.

(56) References Cited

U.S. PATENT DOCUMENTS

| | | | |
|---|---|---|---|
| 2011/0242715 A1 | 10/2011 | Voisine et al. | |
| 2011/0316338 A1 | 12/2011 | Peterson et al. | |
| 2013/0278224 A1* | 10/2013 | Ofek | H02M 7/219 320/137 |
| 2014/0192574 A1* | 7/2014 | Nozaki | G03G 15/80 363/77 |

OTHER PUBLICATIONS

International Search Report, PCT/EP2014/051415, ABB Technology AG, dated May 9, 2014.
Written Opinion, PCT/EP2014/051415, ABB Technology AG, dated May 9, 2014.
European Search Report, EP13154135, ABB Technology AG, dated Jan. 14, 2014.

* cited by examiner

INTELLIGENT ELECTRICAL POWER NETWORK DEVICE

FIELD OF THE INVENTION

The invention relates to electrical power networks and especially to intelligent electrical power network control and/or protection devices used in electrical power network automation, such as in protection and/or control of electrical power networks.

BACKGROUND OF THE INVENTION

Electrical power networks are used for transmitting or distributing electric power to user sites, such as industrial plants, office premises and households. Electrical power networks comprise electric stations, which may comprise one or more transformers to transform a voltage level of the electric power either to a lower voltage level applicable for distribution of electric power to user sites or a higher voltage level applicable for transmission of electric power from the electric energy production plants. Electrical power networks further comprise electric power lines to transmit or distribute the electric power. The number of electric power lines connected to a single electric station may vary. Disconnector stations may be located at different locations in the electrical power network for providing a possibility to change the electrical power network topology for example during different faults or varying electric power consumption situations for optimizing the operation of the electrical power network.

Intelligent electrical power network control and/or protection devices may be used at the electric stations for monitoring, protecting and/or controlling the operation of the electrical power network, i.e. the electric power lines and equipment connected to it, against different faults or abnormal operating situations. The same kind of intelligent electrical power network control and/or protection devices may also be used at disconnector stations. Intelligent electrical power network control and/or protection devices, in turn, comprise a different kind of units to carry out necessary electrical power network monitoring, protection and/or control procedures.

BRIEF DESCRIPTION OF THE INVENTION

An object of the present invention is to provide a novel intelligent electrical power network control and/or protection device.

The invention is characterized by the features disclosed in the independent claims.

According to an embodiment an intelligent electrical power network control and/or protection device comprises at least one power supply connection for connecting the device to a main power source and an auxiliary power source, at least one unit configured to monitor main power, the unit being configured to provide a signal indicating lack of main power in response to a detection of the lack of main power and at least one unit configured to provide a state control operation for changing an operating state of at least one unit of the device and/or an operating state of at least one unit to be connected to the device from an operative mode to a power saving mode in response to the signal indicating the detected lack of main power.

In the context of this specification the term lack of main power may alternatively refer to a total loss of main power or a partial loss of main power, the partial loss of main power referring to a situation where only a part of power of the main power is available.

According to an embodiment the device is configured to provide the state control operation for changing the operating state of at least one unit of the device and/or the operating state of at least one unit to be connected to the device from the operative mode to a power saving mode immediately after the signal indicating the detected lack of main power is provided.

According to an embodiment the unit configured to monitor main power and the unit configured to provide the state control operation for changing the operating state of at least one unit of the device and/or the operating state of at least one unit to be connected to the device from the operative mode to the power saving mode is the one and the same unit.

According to an embodiment the device is configured to activate the auxiliary power source in response to the providing of the signal indicating the detected lack of main power.

According to an embodiment the device comprises at least one unit configured to monitor a power level of the auxiliary power source, the unit being configured to provide an auxiliary power monitoring signal indicating the power level of the auxiliary power source.

According to an embodiment the device is configured to provide the state control operation for changing the operating state of at least one unit of the device and/or the operating state of at least one unit to be connected to the device from the operative mode to the power saving mode in response to a decrease in the power level of the auxiliary power source below at least one limit value. The limit value may be either fixed or settable.

According to an embodiment the device is configured to provide the state control operation for changing the operating state of at least one unit of the device and/or the operating state of at least one unit to be connected to the device from the operative mode to the power saving mode after a delay in response to the signal indicating the detected lack of main power. The delay may be either fixed or settable.

According to an embodiment the device is configured to provide the state control operation for changing the operating state of at least one unit of the device and/or the operating state of at least unit to be connected to the device from the operative mode to the power saving mode in response to an external control command received by the device.

According to an embodiment the unit whose operating state is to be changed is at least one of a communication device and a communication functional block configured to control the operation of the communication device.

According to an embodiment the device is configured to provide the state control operation for changing the operating state of at least one unit of the device and/or the operating state of at least one unit to be connected to the device and being in the power saving mode back to the operative mode in response to a signal indicating restoration of main power.

According to an embodiment the device is configured to provide state control operations for changing the operating state of at least one unit of the device and/or the operating state of at least one unit to be connected to the device between the power saving mode and the operative mode according to an operating state variation routine in response to the signal indicating the detected lack of main power.

According to an embodiment of the device the operating state variation routine comprises two or more successive time periods after which the operating state of at least one unit of the device and/or the operating state of at least one unit to be connected to the device and being in the power saving mode is changed back to the operative mode or the operating state of at least one unit of the device and/or the operating state of at least one unit to be connected to the device and being in the operative mode is changed back to the power saving mode in response to the signal indicating the detected lack of main power.

According to an embodiment of the device the lengths of the time periods of the operating state variation routine are settable.

According to an embodiment of the device the lengths of the time periods of the operating state variation routine are variable on the basis of the power level of the auxiliary power source.

According to an embodiment the device is configured to provide a state control operation for changing the operating state of at least one unit of the device and/or the operating state of at least one unit to be connected to the device and being in the power saving mode back to the operative mode in response to an external control command received by the device.

According to an embodiment of a method for monitoring power supply in connection with an intelligent electrical power network control and/or protection device the method comprises monitoring the power supply of a main power source, providing a signal indicating lack of main power in response to detected lack of main power, and providing a state control operation for changing an operating state of at least one unit of the device or an operating state of at least one unit to be connected to the device from an operative mode to a power saving mode in response to the signal indicating the detected lack of main power.

According to an embodiment of the method, the method further comprises monitoring a power level of an auxiliary power source, providing an auxiliary power monitoring signal indicating the power level of the auxiliary power source, and providing the state control operation for changing the operating state of at least one unit of the device and/or the operating state of at least one unit to be connected to the device from the operative mode to the power saving mode in response to a decrease in the power level of the auxiliary power source below a limit value.

According to an embodiment of the method the state control operation for changing the operating state of at least one unit of the device and/or the operating state of at least one unit to be connected to the device from the operative mode to the power saving mode is provided after a delay in response to the signal indicating the detected lack of main power.

According to an embodiment of the state control operation for changing the operating state of at least one unit of the device and/or the operating state of at least unit to be connected to the device from the operative mode to the power saving mode is provided in response to an external control command received by the device.

According to an embodiment of a computer program the computer program comprises program code means configured to execute the method disclosed in any one of claims 11 to 14 when being run on an intelligent electrical power network control and/or protection device.

According to an embodiment there is an arrangement comprising at least one electrical power network supervisory system, at least one communication server connected to the electrical power network supervisory system and comprising a transmitter and a receiver, at least one intelligent electrical power network control and/or protection device according to any one of claims 1 to 10 and at least one communication device connected to the intelligent electrical power network control and/or protection device and comprising a transmitter and a receiver, and in which arrangement the electrical power network supervisory system is configured to send, through the communication server and the communication device, to the intelligent electrical power network control and/or protection device a control command to change an operating state of at least one unit of the intelligent electrical power network control and/or protection device and/or at least one unit connected to the intelligent electrical power network control and/or protection device between an operative mode and a power saving mode.

According to an embodiment there is a method relating to an arrangement comprising at least one electrical power network supervisory system, at least one communication server connected to the electrical power network supervisory system and comprising a transmitter and a receiver, at least one intelligent electrical power network control and/or protection device according to any one of claims 1 to 10 and at least one communication device connected to the intelligent electrical power network control and/or protection device and comprising a transmitter and a receiver, in which method a control command to change an operating state of at least one unit of the intelligent electrical power network control and/or protection device and/or at least one unit connected to the intelligent electrical power network control and/or protection device between an operative mode and a power saving mode is sent from the electrical power network supervisory system through the communication server and the communication device to the intelligent electrical power network control and/or protection device.

BRIEF DESCRIPTION OF THE DRAWINGS

In the following the invention will be described in greater detail by means of preferred embodiments with reference to the accompanying drawings, in which.

For the sake of clarity, the figures show the embodiments in a simplified manner. In the figures, like reference numerals identify like elements.

DETAILED DESCRIPTION OF THE INVENTION

Figure 1:
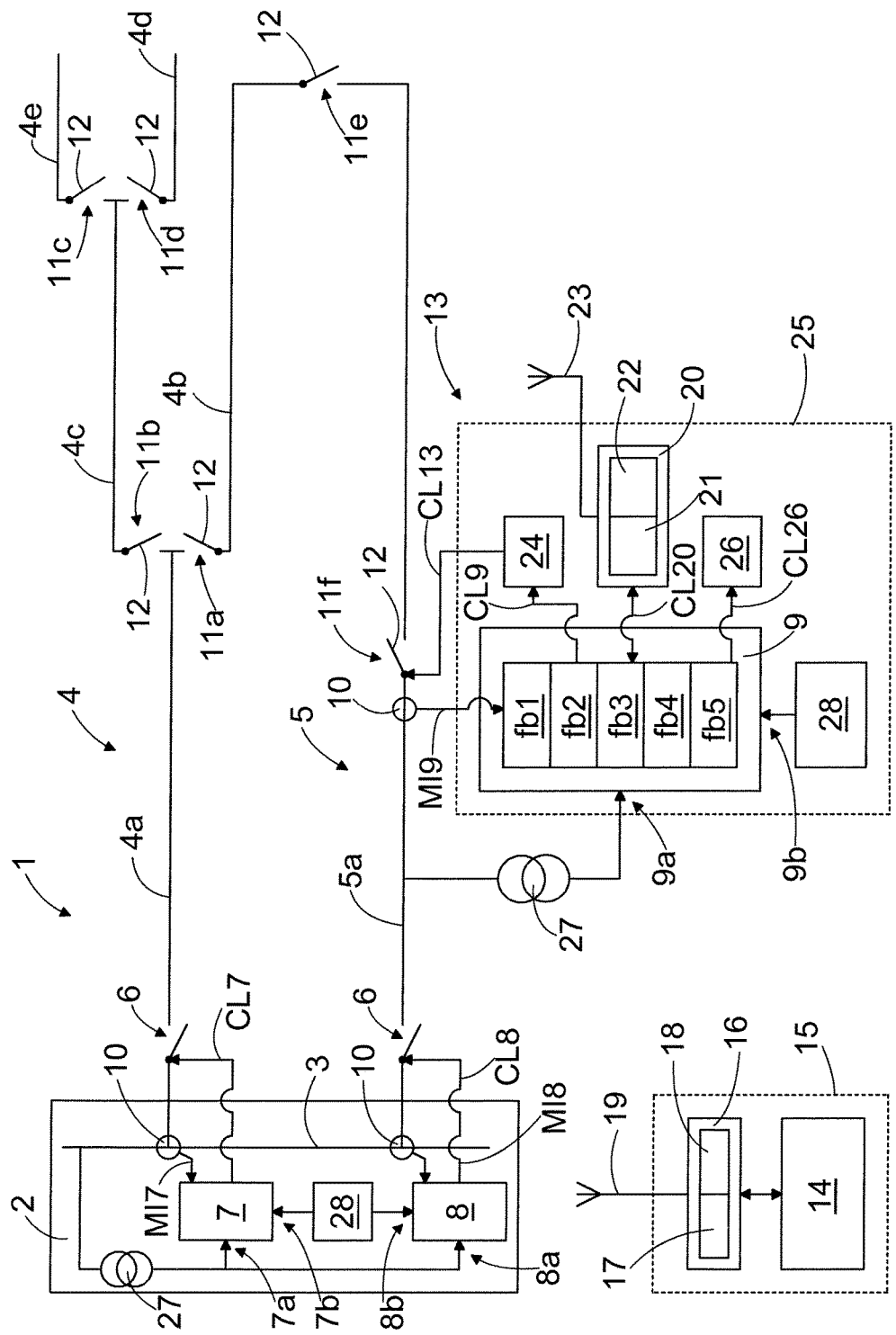
FIG. 1 shows schematically an electrical power network and an intelligent electrical power network control and/or protection device.

FIG. 1 shows schematically an electrical power network 1. The electrical power network 1 of FIG. 1 comprises an electric station 2 comprising a busbar 3 and possible transformers (not shown) to transform a voltage level of the electric power. The electrical power network 1 further comprises two electric power lines 4, 5 or feeders 4, 5 connected to the busbar 3. In a three-phase system the busbar 3 comprises three bars and the electric power lines 4, 5 comprise three phase conductors, but the number of phases in the electrical power networks may, of course, vary depending on local practices. For the sake of clarity the drawing in FIG. 1 is reduced to comprise only one busbar and one phase conductor. In FIG. 1 the electric power line 4 comprises a main line 4a and a number of branch lines, i.e. branch lines 4b, 4c, 4d and 4e, whereas the electric power line 5 comprises only a main line 5a. The electric power lines 4, 5 may be overhead lines or underground lines or combinations of overhead lines and underground lines.

The electric power lines 4, 5 are connected to the busbar 3 by circuit breakers 6, whereby the electric power lines 4, 5 may be connected to the busbar 3 by closing the circuit breakers 6 and disconnected from the busbar 3 by opening the circuit breakers 6. The substation 2 comprises intelligent electronic power network control and/or protection devices 7, 8, which are connected to the circuit breakers 6 via control lines CL7, CL8 to control the opening and closing of the circuit breakers 6 on the basis of the voltages and/or currents prevailing in the electrical power network 1. Hereinafter the intelligent electronic power network control and/or protection devices 7, 8 may also be called IEPND 7 and IEPND 8. The voltages and currents may be measured with voltage and current measuring devices. The voltage is typically measured with a voltage measuring device, such as a voltage transformer or a voltage sensor or a low power voltage transformer, from the busbar 3, since the voltage of the electrical power network 1 is the same in whole galvanically-interconnected electrical power network 1. The currents are measured with current measuring devices, such as current transformers or current sensors, separately at each electric power line 4, 5 since the current prevailing in each electric power line 4, 5 depends on the amount of load connected to the specific electric power line. For the sake of clarity, in FIG. 1 the voltage and current measuring devices at the electric station 2 are shown very schematically with a common graphical symbol denoted with reference number 10 and placed at the interconnections between the busbar 3 and the electric power lines 4, 5. The voltage and current measurement information may be transmitted to the IEPND 7, 8 through communication links MI7 and MI8, which may be implemented with wired or wireless connections.

Electric power lines 4, 5, in turn, comprise disconnector stations 11a, 11b, 11c, 11d, 11e and 11f. The disconnector stations 11a to 11f divide the electrical power network 1 into different zones, which may be connected to the electric station 2 or disconnected from the electric station 2 by closing or opening a disconnector 12 at the specific disconnector stations 11a to 11f. That is, the disconnector stations 11a to 11f may be used as zone dividers, by which the topology of the electrical power network 1 may be altered. For example, referring to FIG. 1, by closing the disconnectors 12 at the disconnector stations 11a, 11b, 11c and 11d the different zones of the electrical power network 1, corresponding to the main line 4a and branch lines 4b, 4c, 4d and 4e, will be galvanically connected together. Alternatively, by closing the disconnectors 12 at the disconnector stations 11a, 11e and 11f a ring type electrical power network between the electrical power lines 4 and 5 may be provided. The operation of the disconnector 12 is controlled with a control arrangement 13, one possible implementation of which is shown in connection with the disconnector station 11f and explained later.

FIG. 1 also discloses a supervisory control and data acquisition system 14, which may also be called SCADA system 14. The SCADA system 14 provides the highest level control system over the electrical power network 1, i.e. the electrical power line supervisory system. It is typically a software-based control system located at the central station 15 (denoted by a broken line) and through which an operator of the electrical power network 1 may receive information about the operation of the electrical power network, information about the voltage and currents prevailing in the electrical power network and a state of individual devices or equipment in the electrical power network, as well as provide control commands to control the operation of devices or equipment connected to the electrical power network. The SCADA system 14 is connected to a communication server 16 comprising a receiver 17 and a transmitter 18 for receiving and sending information between the electrical power network 1 and the central station 15. The communication between the SCADA system 14 and the electrical power network 1 may be based on a wireless connection, such as radio communication indicated by the antenna 19 at the central station 15. The communication may also be provided with a wired connection, whereby there is a wired connection between the central station 15 and the electric station 2. In the wired communication the individual devices or equipment, such as disconnector stations 11a to 11f, in the electrical power network 1 are typically connected to the electric station 2, whereby the communication between the SCADA system 14 and these network devices or equipment is transferred through the electric station 2.

Control arrangement 13 shown in FIG. 1 and intended to control the operation of the disconnector 12 at the disconnector station 11f comprises an intelligent electronic power network control and/or protection device 9, or IEPND 9. IEPND 9 controls the opening and closing of the disconnector 12 on the basis of the voltages and/or currents prevailing in the electric power line 5 or on the basis of the control commands provided by the SCADA 14. As disclosed above in connection with the electric station 2, the voltage and current measurements may be provided for the IEPND 9 from the electric power line 5 with voltage and current measuring devices denoted with a common graphical symbol having the reference number 10. The voltage and current measurement information may be transmitted to the IEPND 9 through a communication link MI9, which may be implemented with a wired or a wireless connection.

The control arrangement 13 further comprises a communication device 20 comprising a receiver unit 21 and a transmitter unit 22 for receiving and sending information between the central station 15 and the control arrangement 13 and/or for receiving and sending information between the electric station 2 and the control arrangement 13. The communication between the SCADA system 14 at the central station 15 and/or the electric station 2 and the control arrangement 13 may be based on a wireless connection, such as radio communication indicated by the antenna 23 at the control arrangement 13 but the communication may also be provided with a wired connection. The operation of the communication device 20 may be controlled for example by a communication functional block fb3 through a control line CL20. In FIG. 1 the communication device 20 provides a kind of a unit to be connected to the IEPND 9 and the communication functional block fb3 provides a kind of a unit of the IEPND 9.

The control arrangement 13 further comprises a disconnector control unit 24 which is connected to the disconnector 12 via control line CL13 for providing to the disconnector 12 a control signal for opening and closing the disconnector 12. The disconnector 12 may comprise, for example, electric motors operating as actuators, or other kind of actuators, for actually opening and closing the disconnector 12. The operation of the disconnector control unit 24 is controlled by the IEPND 9, which is connected to the local control unit 24 through the control line CL9, whereby the IEPND 9, either on the basis of the voltage and current measurements or a control provided by the SCADA 14, will provide a control to the disconnector control unit 24 to open or close the disconnector 12.

The IEPND 9, the communication device 20 and the disconnector control unit 24 are typically enclosed inside a cabinet 25, which is schematically shown by a box drawn in a broken line. The disconnector control unit 24 may also be located outside the cabinet 25, right next to the disconnector 12. Inside the cabinet 25 there may also be an electrical anti condensation heater 26, the operation of which is controlled by the IEPND 9 through a control line CL26. The communication device 20, the disconnector control unit 24 and the electrical anti condensation heater 26 form a kind of units to be connected to the IEPND 9. In addition to those units mentioned, also other units, such as local power meters, AMR concentrators and communication router, which may be either internal or external to the IEPND 9, may be connected to the IEPND 9.

IEPND 9 comprises a number of functional blocks, in FIG. 1 functional blocks fb1, fb2, fb3, fb4, fb5, configured to perform various kinds of operations. These operations may, for example, include protection operations to protect the electrical power network 1 against faults appearing in the electrical power network 1, measurement operations for measuring voltage and currents prevailing in the electric power lines and/or voltage and/or current waveforms during a fault appearing in the electrical power network. A functional block may also include functions for determining power quality characteristics, operations for controlling internal operation of the IEPND 9 or for controlling the operation of devices external to the IEPND 9 and connected to the IEPND 9, and functions for condition monitoring. At least one of the functional blocks is a communication functional block intended to control the operation of the communication device 20 through the control line CL9 and the communication of the IEPND 9 with other parts of the electrical power network 1 or with the central station 15 through the communication device 20. As stated earlier, in the example of FIG. 1 it is assumed that the functional block fb3 is intended for controlling the operation of the communication device 20. The construction and operation of the IEPND 7, 8 may be similar as explained in connection with the IEPND 9 above and later.

Functional blocks form a kind of units of the IEPND. Functional blocks are typically implemented as a computer program such that the operations or functions implemented in the functional blocks are carried out by executing one or more software or computer program code designed for the particular purpose. The computer program comprises program code means configured to execute the disclosed actions and steps when run on the intelligent electrical power network control and/or protection device. The operations of the functional blocks may, of course be implemented at least partly with hardware solutions.

The actual implementation of the intelligent electrical power network control and/or protection device may vary. According to an embodiment, the IEPND may be implemented as a protection and control relay. The IEPND may, however, be any kind of device, such as a computer or the like, which comprises for example a microprocessor, signal processor or the like and memory, which can be configured to execute one or more software or computer programs designed to execute the disclosed actions and steps determined in the one or more functional blocks. The control of the internal operation of the IEPND may be implemented by software or program code separate from the implementation of the functional blocks.

The IEPND 9 comprises a main power supply connection 9a for connecting the IEPND 9 to a main power source. As the main power source in the control arrangement 13 at the disconnector station 11f there is provided a transformer 27 connected to the electric power line 5, whereby the main power to the IEPND 9 is provided by the power at the electric power line 5. The IEPND 7 and IEPND 8 at the electric station 2 comprise similarly main power supply connections 7a and 8a connected to the transformer 27, which, in turn, is connected to the busbar 3, for example. Instead of or in addition to the power of the electric power line, solar photovoltaic cells or wind turbines, for examples, may be used as a main power source for the IEPND 7, 8 and 9.

The IEPND 9 also comprises an auxiliary power supply connection 9b for connecting the IEPND 9 to an auxiliary power source. As the auxiliary power source in the control arrangement 13 at the disconnector station 11f there is provided a rechargeable battery 28 connected to the IEPND 9. Instead of or in addition to the rechargeable battery 28, also some other auxiliary power sources may be provided. In the embodiment of FIG. 1 the rechargeable battery 28 is located inside the cabinet 25, the rechargeable battery 28 being external to the IEPND 9, whereby the auxiliary power supply connection 9b in the IEPND 9 is an external auxiliary power supply connection. Alternatively, the rechargeable battery 28 may be placed inside the IEPND 9, whereby the IEPND 9 will comprise an internal auxiliary power supply connection 9b. The auxiliary power source may also be located outside the cabinet 25. The auxiliary power source may also be an auxiliary power source common to two or more devices.

In a similar way, the IEPND 7 and IEPND 8 comprise auxiliary power supply connections 7b and 8b for connecting the IEPND 7, 8 to an auxiliary power source provided by the rechargeable battery 28 at the electric station 2, the rechargeable battery 28 at the electric station 2 being common to both IEPND 7 and IEPND 8.

In the embodiment of FIG. 1 there are thus separate power supply connections for the main power source and the auxiliary power source. Alternatively, there may be only one power supply connection for both the main power source and the auxiliary power source. If there is only one power supply connection for both the main power source and the auxiliary power source, there may be a selection means to connect either the main power source or the auxiliary power source to the power supply connection of the IEPND at a time. Alternatively, if there is only one power supply connection for both the main power source and the auxiliary power source, the auxiliary power source may be connected to the power supply connection of the IEPND all the time and the main power source may be connected to the auxiliary power source, whereby the power needed for the operation of the IEPND is provided all the time by the auxiliary power source and the main power source is arranged to charge the auxiliary power supply so as to keep the power level of the auxiliary power source high enough for the proper operation of the IEPND. In this case it may be said that the main power source is connected to the IEPND through the auxiliary power source.

In a normal operating state of the electrical power network 1, when the electric power line 5 is live, i.e. when power is connected to the electric power line 5, the power to the IEPND 9 and other devices in the cabinet 25 is supplied by the transformer 27. In case of loss of power in the electric power line 5, the power supply to the IEPND 9 and other devices in the cabinet 25 is provided by the rechargeable battery 28 or some other auxiliary power source. Because also power supply to actuators for operating the disconnector 12 may be provided through the control arrangement 13 by the rechargeable battery 28 during power outages in the electric power line 5, the sufficiency of charge in the rechargeable battery 28 during long-time power loss or power outage must be considered.

If it is expected that the power outage in the electric power line 5 is very long, for example several hours or days, there may arise a need to save charge in the rechargeable battery 28. Charge stored by the rechargeable battery 28 may be saved, for example, by changing an operating state of at least one unit, such as a functional block, of the intelligent electrical power network control and/or protection device from an operative mode to a power saving mode in response to detected lack of main power. Alternatively or at the same time, an operating state of at least one unit, such as an external accessory, to be connected to the intelligent electrical power network control and/or protection device may be changed from an operative mode to a power saving mode in response to detected lack of main power. When charge is being saved during power outages of the main power supply, it is for example possible to maintain longer the ability to reclose the disconnector 12 or the circuit breaker 6 when attempts are made to restore power to certain parts of the electrical power network.

The lack of main power may be a total loss of main power, whereby there is no power supply from the main power source at all. The lack of main power may also be a partial loss of main power, the partial loss of main power referring to a situation where only part of a maximum power supply of the main power source is available. This may be the case, for example, when the solar photovoltaic cells or wind turbines are used as the main power source and the prevailing weather conditions do not provide the maximum power generation by the solar photovoltaic cells or wind turbines.

The power saving mode of a unit may comprise several states, wherein one or more operations of the unit are at least partly switched off. For example, if there is a screen unit available in the IEPND, the screen unit may be in full operation having full brightness during the normal supply of the main power. However, during the lack of the main power, the screen unit may be controlled to a power saving mode wherein the brightness of the screen unit has been reduced, or to a power saving mode wherein the screen unit is completely switched off. The power saving mode of the unit may thus comprise several different states among which the amount of the power to be saved may vary.

For detecting the lack of main power the IEPND 9 comprises at least one unit, such as a functional block, configured to monitor presence or lack of main power at the main power supply connection 9a. Alternatively, if the main power source is connected to the IEPND 9 through the auxiliary power source as explained above, the presence or lack of main power may be monitored by inspecting the voltage level of the rechargeable battery 28, for example the battery voltage may be higher than the nominal voltage of the battery when the main power is available.

The unit monitoring the main power may also be configured to provide a signal indicating a detection of presence or a detection of lack of main power. The signal, which may also be called a main power monitoring signal, may have a form of a discrete signal or a continuous signal, whereby different signal levels indicate whether or not there is main power available, i.e. if the main power is on or off. For example, a signal level having a logical value "1" may indicate that there is main power available and a signal level having a logical value "0" may indicate that there is no main power at all available or that only a part of the main power is available. The unit relating to the monitoring of the presence or lack of main power may be implemented by hardware and/or software. If implemented by software, the unit may be implemented for example by one functional block or a part of the control of the internal operation of the IEPND.

According to an embodiment the IEPND 9 comprises at least one unit configured to monitor the charge level of the auxiliary power source. The unit configured to monitor the charge level of the auxiliary power source may be configured to provide an auxiliary power monitoring signal indicating the charge level of the auxiliary power source. Depending on the type of the auxiliary power source used the variable indicating the power level by the auxiliary power monitoring signal may also be something other than the charge level of the auxiliary power source having the type of the rechargeable battery.

The auxiliary power monitoring signal may have a form of a continuous-time signal or a discrete-time signal. The signal indicating the power level of the auxiliary power source may have a form indicating the power level as percentages relative to the full power level, wherein a percentage value 100% indicates a full power in the auxiliary power source. The unit configured to monitor the power level of the auxiliary power source may be implemented by hardware and/or software and if implemented by software, it may be implemented for example by one functional block or as part of the control of the internal operation of the IEPND.

Figure 2:
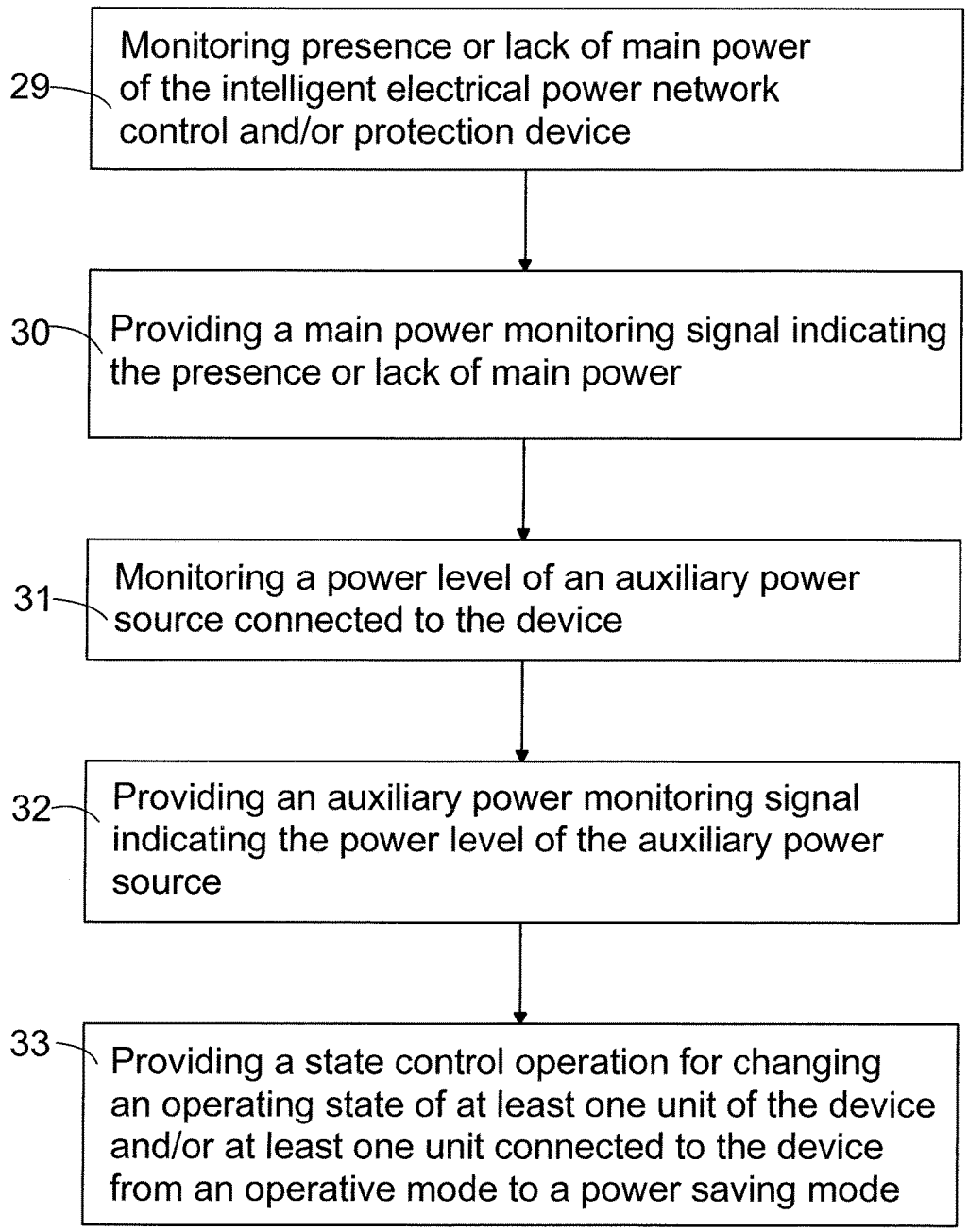
FIG. 2 shows schematically a flow diagram of a method for saving power of an auxiliary power supply in connection with an intelligent electrical power network control and/or protection device.

FIG. 2 discloses schematically, in the form of a flow diagram, an example of a method for saving power of an auxiliary power source in connection with an intelligent electrical power network control and/or protection device. In the method step referred by reference number 29, presence or lack of main power is monitored. In the method step referred by reference number 30, a signal, i.e. the main power monitoring signal, indicating the presence or lack of main power is provided. In the method step referred by reference number 33 a state control operation is provided for changing an operating state of at least one unit of the device and/or an operating state of at least one unit connected to the device from an operative mode to a power saving mode in response to the main power monitoring signal indicating detected lack of main power.

The example of FIG. 2 also comprises two additional method steps, the method steps being referred to by reference numbers 31 and 32. In the method step referred by reference number 31, a charge level of an auxiliary power source to be connected to the device is monitored and in the method step referred by reference number 32 an auxiliary power monitoring signal indicating the charge level of the auxiliary power source is provided. Depending on the charge level of the auxiliary power source, for example, the change of the operating state of the unit of the device or of the unit connected to the device may be delayed.

According to an embodiment the intelligent electrical power network control and/or protection device is configured to provide the state control operation for changing the operating state of at least one unit of the device and/or an operating state of at least one unit connected to the device from the operative mode to the power saving mode immediately after the main power monitoring signal indicates the detected lack of main power. The state control operation may be provided by the control of the internal operation of the IEPND or by a unit of the IEPND, such as by a specific functional block, in response to the detected lack of main power. The unit of the device providing the state control operation may be the one and the same unit which detects the lack of main power.

According to an embodiment the intelligent electrical power network control and/or protection device comprises a unit to activate the auxiliary power source in response to the signal indicating the detected lack of main power. This embodiment may be used if the auxiliary power source is not available automatically in case of lack of main power.

According to an embodiment the intelligent electrical power network control and/or protection device is configured to provide the state control operation for changing the operating state of at least one unit of the device and/or the operating state of at least unit connected to the device from the operative mode to the power saving mode after a delay after the main power monitoring signal indicates the detected lack of main power. The delay may be either fixed or settable by the operator of the electrical power network through the communication link between the central station and the IEPND. The delay may be 10 to 30 minutes, for example. When the change of the operating state takes place after a delay, short interruptions in the main power supply do not affect on the operation of the intelligent electrical power network control and/or protection device.

According to an embodiment the intelligent electrical power network control and/or protection device is configured to provide the state control operation for changing the operating state of at least one unit of the device and/or the operating state of at least one unit connected to the device from the operative mode to the power saving mode in response to the decrease in the charge level of the auxiliary power source below a limit value. The limit value may be fixed or settable by the operator of the electrical power network through the communication link between the central station and the IEPND. The limit value may be 80% of the full charge level, for example. There may also be available several successive limit values, whereby the number of units whose operating state is changed from the operative mode to the power saving mode, may be increased when the charge level of the auxiliary power source decreases.

According to an embodiment the intelligent electrical power network control and/or protection device is configured to provide the state control operation for changing the operating state of at least one unit of the device and/or the operating state of at least one unit connected to the device from the operative mode to the power saving mode in response to an external control command received by the device. This external control command may be for example a control command set by the operator of the electrical power network in the SCADA system 14 and received by the IEPND through the communication link between the central station and the IEPND after the main power monitoring signal has indicated the detected lack of main power. This external control command may be used for example when the operator has the information that the interruption in the power supply in certain parts of the network will last quite a long time, for example several hours.

When the operating state of the unit of the IEPND and/or the operating state of the unit connected to the device is changed from the operative mode to the power saving mode without the external control command from the SCADA system 14, the communication functional block may send, through the communication device 20, a signal to the SCADA 14 indicating that the operating state of at least one unit of the IEPND and/or unit connected to the IEPND has been changed from the operative mode to the power saving mode. The signal may also individualize these units the operating state of which has been changed.

According to an embodiment the operating state of at least one unit of the IEPND and/or the operating state of at least one unit connected to the IEPND is changed from an operative mode to the power saving mode after the main power monitoring signal indicates the detected lack of main power and/or the auxiliary power monitoring signal indicates a decrease in the power level of the auxiliary power source below at least one limit value.

According to an embodiment the operating state of two or more units of the IEPND and/or the operating state of two or more units connected to the IEPND are changed from the operative mode to the power saving mode at the same time after the main power monitoring signal has indicated the detected lack of main power and/or the auxiliary power monitoring signal has indicated a decrease in the power level of the auxiliary power source below at least one limit value.

According to an embodiment the operating state of two or more units of the IEPND and/or the operating state of two or more units connected to the IEPND are changed from the operative mode to the power saving mode consecutively at certain time intervals after the main power monitoring signal has indicated the detected lack of main power and/or the auxiliary power monitoring signal has indicated a decrease in the power level of the auxiliary power source below at least one limit value.

The unit of the IEPND and/or the units connected to the IEPND may be divided into groups of more critical units and less critical units, whereby the change of the operating state of the units may be controlled on the basis of the importance of the units, for example in such a way that the operating states of the units being less critical are changed first from the operative mode to the power saving mode. For example the units relating to the fault protection can be considered to be more critical than the units relating to communication or determination of power quality, for example.

According to an embodiment the operating state of at least communication functional block and/or the operating state of the communication device is changed from the operative mode to the power saving mode. The communication between the central station 15 and/or electric station 2 and the IEPND, or between different IEPNDs at different disconnector stations, will consume quite a lot of power, whereby if the operating state of the communication device and the communication functional block may be changed from the operative mode to the power saving mode during main power supply interruptions, the life-time of the auxiliary power source can be substantially increased.

The operating state of at least one unit of the IEPND and/or unit connected to the IEPND may change its operating state from the power saving mode back to the operative mode when the main power is again available, or if needed, also when there is still the lack of main power. The change in the operating state from the power saving mode back to the operative mode may be initiated by a state control operation, which is activated in response to restoring of the main power, an operating state variation routine or an external control command received by the IEPND. The state control operation may be provided by the control of the internal operation of the IEPND or by a specific functional block of the IEPND, for example.

According to an embodiment the intelligent electrical power network control and/or protection device is configured to provide the state control operation for changing the operating state of at least one unit of the device and/or the operating state of at least one unit connected to the device and being in the power saving mode, back to the operative mode in response to the main power monitoring signal indicating the restore of main power. The change of the operating state from the power saving mode back to the operative mode may take place immediately after the main power monitoring signal indicates the restoration of main power. The change of the operating state from the power saving mode back to the operative mode may also take place after a fixed or settable delay, if the operations provided by the units are not critical for reliable monitoring and/or control of the electrical power network. The effect of the delay is to avoid pointless operating state changes if the restoration of main power is only temporary.

According to an embodiment the intelligent electrical power network control and/or protection device is configured to provide the state control operation for changing the operating state of at least one unit of the device and/or the operating state of at least one unit connected to the device and being in the power saving mode back to the operative mode temporarily according to an operating state variation routine as the main power monitoring signal still indicates the lack of main power. The operating state variation routine comprises a procedure according to which the operating state of at least one unit of the device and/or the operating state of at least one unit connected to the device may be changed from the power saving mode back to the operative mode and further back to the power saving mode, if the main power has not been restored.

According to an embodiment the operating state variation routine comprises two or more successive time periods after which the operating state of at least one unit of the device and/or the operating state of at least one unit connected to the device and being in the power saving mode is changed back to the operative mode or the operating state of at least one unit of the device and/or the operating state of at least one unit connected to the device and being in the operative mode is changed back to the power saving mode as the main power monitoring signal indicates the detected lack of main power. The lengths of the time periods mentioned above may be fixed or settable or the lengths of the time periods may also be varied for example on the basis of the power level of the auxiliary power source.

According to an embodiment the intelligent electrical power network control and/or protection device is configured to provide the state control operation for changing the operating state of at least one unit of the device and/or the operating state of at least one unit connected to the device and being in the power saving mode back to the operative mode in response to an external control command received by the device. This external control command may, for example, be a control command set by the operator of the electrical power network in the SCADA system 14 and received by the IEPND through the communication link between the central station and the IEPND after the main power monitoring signal has started to indicate the detected lack of main power of the device. This external control command may, for example, be used when the operator has the information that the restoration of power supply in certain parts of the network will be initiated after a long power supply interruption. The change of the operating state may take place immediately after the external control command is received by the IEPND. Alternatively, the change of the operating state may take place after a delay, for example in such a way that when the operating state of the unit changes from the power saving mode back to the operative mode according to the operating state variation routine, the external control command is observed by the unit and the unit remains in the operative mode in response to the external control command. This may happen for example if the unit in the power saving mode is the communication functional block, whereby the communication functional block observes the external control command set by the operator when the communication functional block changes the operating state from the power saving mode back to the operative mode as determined in the operating state variation routine.

The steps disclosed above may be implemented by a computer program comprising program code means configured to execute the steps disclosed above when being run on an intelligent electrical power network device.

Figure 3:
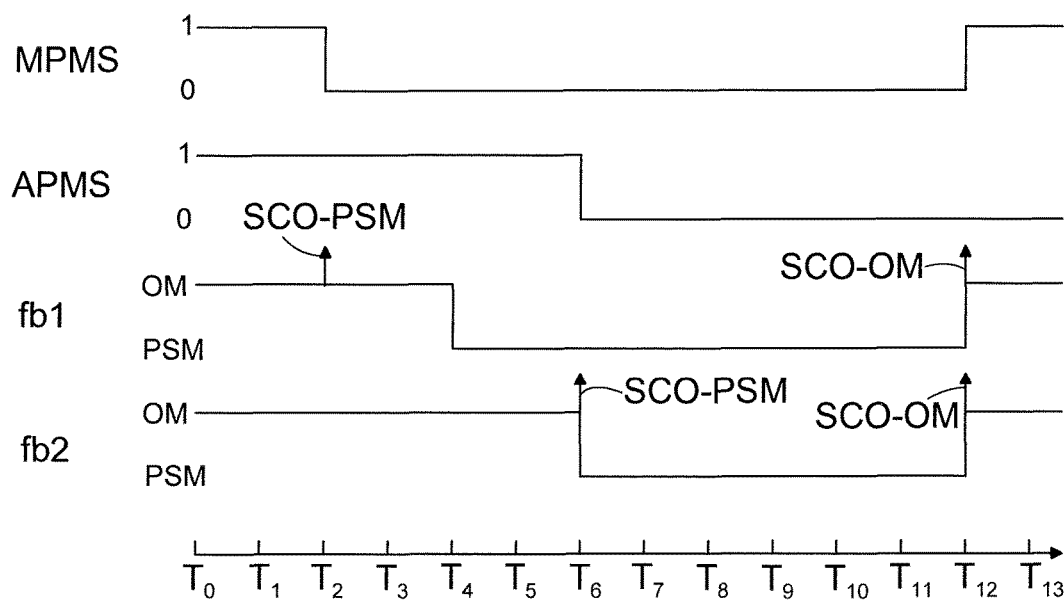
FIG. 3 shows schematically an example of an operating state change of a unit of an intelligent electrical power network control and/or protection device.
Figure 4:
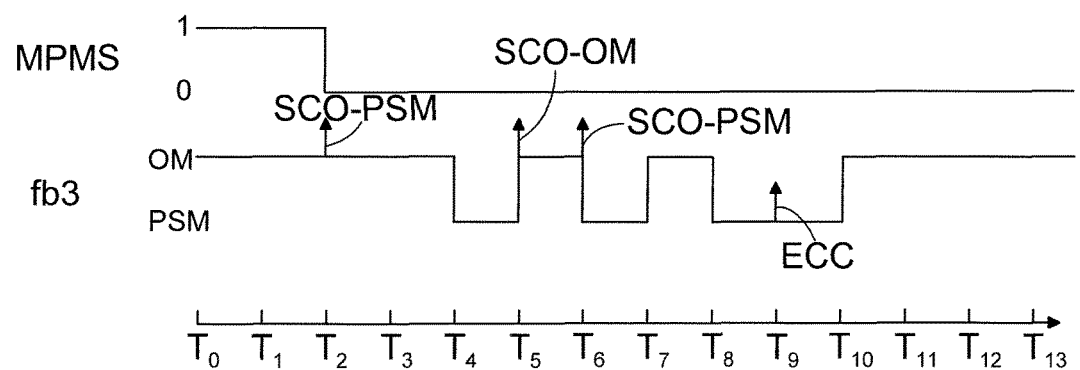
FIG. 4 shows schematically another example of an operating state change of a unit of an intelligent electrical power network control and/or protection device.

FIGS. 3 and 4 show schematically some examples about operating state changes of some units of the device. In FIGS. 3 and 4 the abbreviation MPMS stands for the main power monitoring signal, the abbreviation APMS stands for the auxiliary power monitoring signal, the abbreviation ECC stands for the external control command, the abbreviations fb1, fb2 and fb3 stand for the first, second and third functional blocks, the abbreviation OM stands for the operative mode of the functional block, the abbreviation PSM stands for the power saving mode of the functional block, the abbreviation SCO-PSM stands for the state control operation for causing the change of the operating state from the operative mode to the power saving mode and the abbreviation SCO-OM stands for the state control operation for causing the change of the operating state from the power saving mode back to the operative mode.

In the example of FIG. 3 application unit configured to monitor presence or lack of main power indicates at time instant $T_2$, by changing the main power monitoring signal level from level 1 to level 0, that the main power is not available, i.e. there is lack of main power of the IEPND. In response to this, the IEPND provides at time instant $T_2$ a state control operation SCO-PSM for changing the operating state of the first functional block fb1 from the operative mode to the power saving mode after a delay of two periods, the actual change of the operating state thus taking place at time instant $T_4$. Because there is the lack of main power, as indicated by the main power monitoring signal being at level 0, the charge of an auxiliary power source is used for providing power to the IEPND and possible units connected to it. At time instant $T_6$ a unit monitoring a charge level of the auxiliary power supply indicates, by changing the auxiliary power monitoring signal level from level 1 to level 0, that the charge level of the auxiliary power source has decreased below a certain limit value. In response to this the IEPND provides at the same time instant $T_6$ a state control operation SCO-PSM directed to the second functional block fb2 for changing the operating state of the second functional block fb2 from the operative mode to the power saving mode at the same time instant $T_6$. The operating states of both functional blocks fb1, fb2 have thus been changed from the operative mode to the power saving mode for saving the power in the auxiliary power source. At time instant $T_{12}$ the main power supply is available again, whereby the IEPND provides at the same time instant $T_{12}$ state control operations SCO-OM for changing the operating states of the first and second functional blocks fb1, fb2 from the power saving mode back to the operative mode.

In the example of FIG. 4 the first application configured to monitor presence or lack of main power of the IEPND indicates at time instant $T_2$, by changing the main power monitoring signal level from level1 to level 0, that the main power is not available, i.e. there is lack of main power of the IEPND. As a response to this, the IEPND provides at time instant $T_2$ a state control operation SCO-PSM for changing the operating state of the third functional block fb3 from the operative mode to the power saving mode after a delay of two periods, the actual change of the operating state thus taking place at time instant $T_4$. Because there is the lack of main power as indicated by the main power monitoring signal being at level 0, the charge of an auxiliary power source is used to provide power to the IEPND and possible units connected to it. At time instant $T_5$ the IEPND provides a state control operation SCO-OM for changing the operating state of the third functional block fb3 from the power saving mode back to the operative mode. As there is still the lack of main power of the IEPND, as indicated by the signal level 0 of the main power monitoring signal, the IEPND provides again the state control operation SCO-PSM at time instant $T_6$ for changing immediately the operating state of the third functional block fb3 from the operative mode to the power saving mode for saving power in the auxiliary power source. The same procedure takes place at time instants $T_7$ and $T_8$, after which the third functional block fb3 will remain in the power mode for a longer time, such that at time instant $T_{10}$ the operating state of the third functional block is changed back to the operative mode. The IEPND is thus configured to provide successive state control operations for changing the operating state of the functional block being in the power saving mode back to the operative mode temporarily according to an operating state variation routine determined in the IEPND when the main power monitoring signal indicates lack of main power.

Further, in the example of FIG. 4, the IEPND receives at time instant $T_9$ an external control command ECC set by the operator of the electrical power network through the SCADA 14. As a response of receiving the ECC the third functional block fb3 remains in the operative mode when the operating state of the third functional block is changed from the power saving mode back to the operative mode next time, i.e. at time instant $T_{10}$, according to the operating state variation routine. Alternatively, the external control command ECC may force or compel the third functional block to change the operating state from the power saving mode back to the operative mode immediately, for example.

It will be obvious to a person skilled in the art that, as the technology advances, the inventive concept can be implemented in various ways. The invention and its embodiments are not limited to the examples described above but may vary within the scope of the claims. In the examples above the intelligent electrical power network control and/or protection device is used in connection with the circuit breakers 6 or disconnector stations 11a to 11f, but the intelligent electrical power network control and/or protection devices disclosed may also be used in connection with any other primary units such as reclosers and switches.

The invention claimed is:

1. An intelligent electrical power network control and/or protection device comprising at least one power supply connection for connecting the device to a main power source and an auxiliary power source, at least one unit configured to monitor main power, the unit being configured to provide a signal indicating lack of main power in response to a detection of the lack of main power, and at least one unit configured to provide a state control operation for changing an operating state of at least one unit of the device and/or an operating state of at least one unit to be connected to the device from an operative mode to a power saving mode in response to the signal indicating the detected lack of main power.

2. The intelligent electrical power network control and/or protection device as claimed in claim 1, wherein the device comprises at least one unit configured to monitor a power level of the auxiliary power source, the unit being configured to provide an auxiliary power monitoring signal indicating the power level of the auxiliary power source.

3. The intelligent electrical power network control and/or protection device as claimed in claim 2, wherein the device is configured to provide the state control operation for changing the operating state of at least one unit of the device and/or the operating state of at least one unit to be connected to the device from the operative mode to the power saving mode in response to a decrease in the power level of the auxiliary power source below at least one limit value.

4. The intelligent electrical power network control and/or protection device as claimed in claim 2, wherein the device is configured to provide the state control operation for changing the operating state of at least one unit of the device and/or the operating state of at least one unit to be connected to the device from the operative mode to the power saving mode after a delay in response to the signal indicating the detected lack of main power.

5. The intelligent electrical power network control and/or protection device as claimed in claim 2, wherein the device is configured to provide the state control operation for changing the operating state of at least one unit of the device and/or the operating state of at least one unit to be connected to the device from the operative mode to the power saving mode in response to an external control command received by the device.

6. The intelligent electrical power network control and/or protection device as claimed in claim 2, wherein the unit whose operating state is to be changed is at least one of a communication device and a communication functional block configured to control the operation of the communication device.

7. The intelligent electrical power network control and/or protection device as claimed in claim 2, wherein the device is configured to provide the state control operation for changing the operating state of at least one unit of the device and/or the operating state of at least one unit to be connected to the device and being in the power saving mode back to the operative mode in response to a signal indicating restoration of main power.

8. The intelligent electrical power network control and/or protection device as claimed in claim 1, wherein the device is configured to provide the state control operation for changing the operating state of at least one unit of the device and/or the operating state of at least one unit to be connected to the device from the operative mode to the power saving mode after a delay in response to the signal indicating the detected lack of main power.

9. The intelligent electrical power network control and/or protection device as claimed in claim 1, wherein
the device is configured to provide the state control operation for changing the operating state of at least one unit of the device and/or the operating state of at least unit to be connected to the device from the operative mode to the power saving mode in response to an external control command received by the device.

10. The intelligent electrical power network control and/or protection device as claimed in claim 1, wherein
the unit whose operating state is to be changed is at least one of a communication device and a communication functional block configured to control the operation of the communication device.

11. The intelligent electrical power network control and/or protection device as claimed in claim 1, wherein
the device is configured to provide the state control operation for changing the operating state of at least one unit of the device and/or the operating state of at least one unit to be connected to the device and being in the power saving mode back to the operative mode in response to a signal indicating restoration of main power.

12. The intelligent electrical power network control and/or protection device as claimed in claim 1, wherein
the device is configured to provide state control operations for changing the operating state of at least one unit of the device and/or the operating state of at least one unit to be connected to the device between the power saving mode and the operative mode according to an operating state variation routine in response to the signal indicating the detected lack of main power.

13. The intelligent electrical power network control and/or protection device as claimed in claim 12, wherein the operating state variation routine comprises
two or more successive time periods after which the operating state of at least one unit of the device and/or the operating state of at least one unit to be connected to the device and being in the power saving mode is changed back to the operative mode or the operating state of at least one unit of the device and/or the operating state of at least one unit to be connected to the device and being in the operative mode is changed back to the power saving mode in response to the signal indicating the detected lack of main power.

14. The intelligent electrical power network control and/or protection device as claimed in claim 1, wherein
the device is configured to provide a state control operation for changing the operating state of at least one unit of the device and/or the operating state of at least one unit to be connected to the device and being in the power saving mode back to the operative mode in response to an external control command received by the device.

15. A method for monitoring power supply in connection with an intelligent electrical power network control and/or protection device, the method comprising
monitoring power supply of a main power source,
providing a signal indicating lack of main power in response to a detected lack of main power,
providing a state control operation for changing an operating state of at least one unit of the device or an operating state of at least one unit to be connected to the device from an operative mode to a power saving mode in response to the signal indicating the detected lack of main power,
monitoring a power level of an auxiliary power source,
providing an auxiliary power monitoring signal indicating the power level of the auxiliary power source, and
providing the state control operation for changing the operating state of at least one unit of the device and/or the operating state of at least one unit to be connected to the device from the operative mode to the power saving mode in response to a decrease in the power level of the auxiliary power source below a limit value.

16. The method according to claim 15, wherein
the state control operation for changing the operating state of at least one unit of the device and/or the operating state of at least one unit to be connected to the device from the operative mode to the power saving mode is provided after a delay in response to the signal indicating the detected lack of main power.

17. The method according to claim 15, wherein
the state control operation for changing the operating state of at least one unit of the device and/or the operating state of at least unit to be connected to the device from the operative mode to the power saving mode is provided in response to an external control command received by the device.

18. A computer program comprising program code means configured to execute the method disclosed in claim 15 when run on an intelligent electrical power network control and/or protection device.

19. A computer program comprising program code means configured to execute the method disclosed in claim 15 when run on an intelligent electrical power network control and/or protection device.

* * * * *